United States Patent [19]
Hillyer

[11] 3,803,947
[45] Apr. 16, 1974

[54] EPICYCLIC CHANGE SPEED GEAR HUBS

[76] Inventor: Anthony William Hillyer, 208 Gotham Rd., East Leake, Leicestershire, Loughborough, England

[22] Filed: Jan. 6, 1972

[21] Appl. No.: 215,758

[30] Foreign Application Priority Data
Jan. 8, 1971  Great Britain.................... 1123/71

[52] U.S. Cl.............................................. 74/750 B
[51] Int. Cl.............................................. F16h 3/44
[58] Field of Search................................ 74/750 B

[56] References Cited
UNITED STATES PATENTS
3,257,868  6/1966  Preece................................ 74/750 B
3,432,013  3/1969  Matsumoto..................... 74/750 B X
3,172,305  3/1965  Schwerdhofer..................... 74/750 B FOREIGN PATENTS OR APPLICATIONS
912,633  12/1962  Great Britain.................... 74/750 B Primary Examiner—Arthur T. McKeon
Attorney, Agent, or Firm—Shaffert, Miller & Browne

[57] ABSTRACT

In an epicyclic 3-speed hub wherein an input motion is applied selectively to a planet cage or to a gear ring through a coupling member, a direct drive is transmitted from the coupling member to the gear ring through a pawl and ratchet means thus to ensure a positive drive connection between an input member and the hub shell irrespective of the gear selected and any maladjustment of the gear.

8 Claims, 8 Drawing Figures

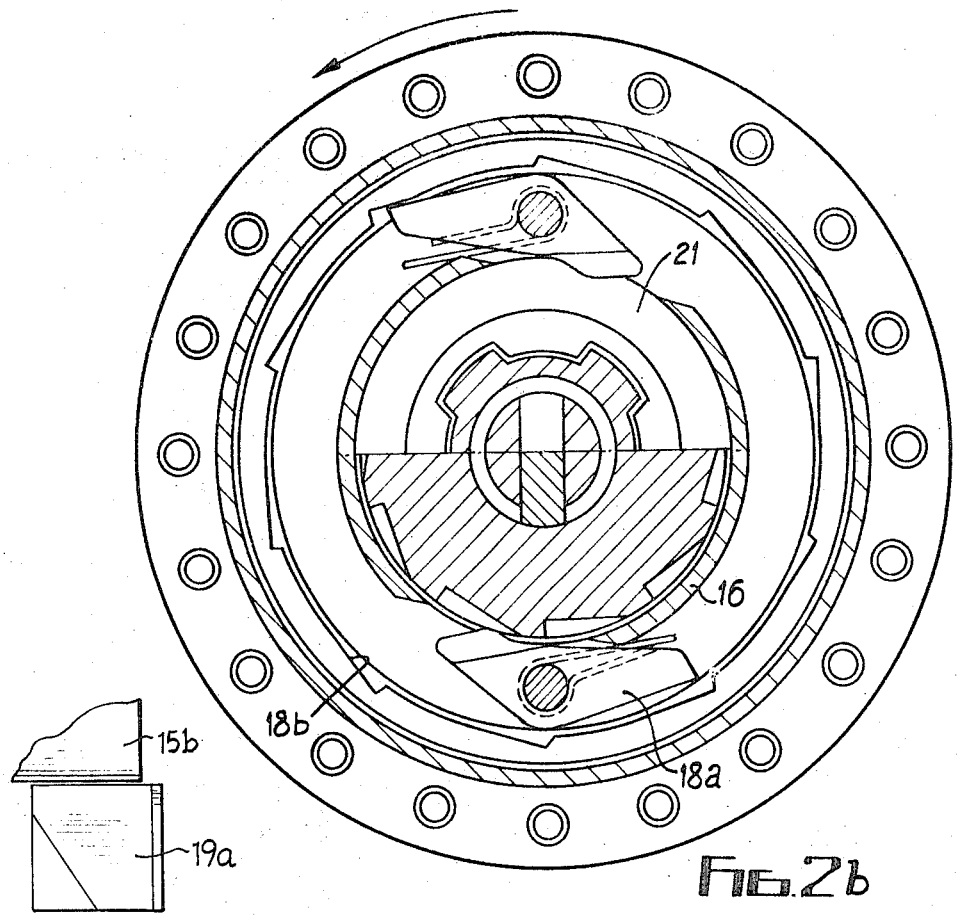
FIG.2b
FIG.2c
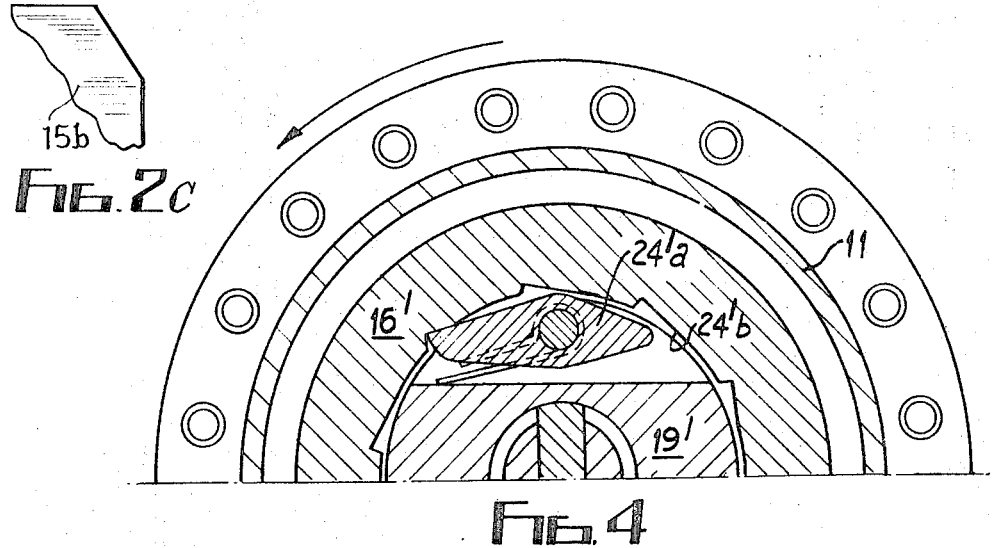
FIG.4

EPICYCLIC CHANGE SPEED GEAR HUBS

The invention concerns epicyclic change speed gear hubs and has more particular reference to epicyclic change speed gear hubs for bicycles, tricycles, and the like.

In conventional epicyclic change speed gear hubs for tricycles it is possible, during the operation of changing gear, to have such a relative disposition of parts within the hub that a drive transmission element, usually the axially slidable coupling sleeve or its equivalent, whilst being drivingly connected to a chain sprocket at the input side, is disconnected from its driven member, usually a planet cage or gear ring, and thus the chain sprocket can be rotated without resistance.

A similar 'between-gear' position can be assumed by a badly-adjusted gear, an intended adjustment from one gear to another, merely selecting such 'between-gear' position.

If a hub is in a 'between-gears' position as aforesaid and pressure is applied to the pedals of a bicycle to which the hub is applied by the rider, the absence of any resistance to pedal movement, if unexpected by the rider may cause him to swerve and thus constitute a danger to himself and to other road users.

The primary object of the present invention is to provide an epicyclic change speed gear for a bicycle wherein no 'between-gears' condition exists either due to a maladjustment of the gear or during actual gear change.

According to one aspect of the invention, an epicyclic change-speed hub including an axially shiftable coupling member selectively cooperable with a planet cage or with a gear ring according to the gear selection required is characterised by a unidirectional clutch connecting the coupling member and the gear ring for transmitting a direct drive to such gear ring from the coupling member.

According to another aspect of the present invention an epicyclic change speed hub comprising a hub shell, a hub spindle extending axially of the said hub shell, a fixed sun gear secured to the said spindle, a plurality of planet gears angularly spaced about the said sun gear and in mesh therewith, a planet cage rotatably supporting the said planet gears, a gear ring arranged coaxially with the sun gear and in mesh with the said planet gears, a first uni-directional clutch means between the planet cage and hub shell, a second uni-directional clutch means between the gear ring and hub shell, a driver rotatably mounted relative to the hub spindle and arranged coaxially therewith and an axially slidable coupling sleeve drivingly connected with the said driver and selectively connectable with the planet cage and the gear ring according to gear selection, is characterised by a further uni-directional clutch means arranged between the coupling sleeve and gear ring, the said further uni-directional clutch means being adapted to transmit a drive motion from the coupling sleeve to the gear ring in the drive direction thereof or not according to gear selection and the coupling sleeve being automatically disengageable from the planet cage on reverse motion of the driver, if so engaged.

Preferably, the further uni-directional clutch means comprises a pawl and ratchet arrangement and a trip means adapted to hold the pawls of such arrangement in an inoperative position or to release such pawls into an operative position according to the relative axial positions of the gear ring and coupling sleeve.

According to a further preferred feature of the invention the pawls of the pawl and ratchet arrangement which defines the further uni-directional clutch means are carried by the gear ring and the ratchet with which such pawls co-operate is provided on the coupling sleeve.

The invention will now be described further, by way of example only, with reference to the accompanying drawings in which:

FIG. 1 is a longitudinal section taken through one form of epicyclic change speed hub constructed in accordance with the invention, the upper part of the drawing showing a relative disposition of parts corresponding to a 'high gear' condition of the hub and the lower part a relative disposition corresponding to a 'low-gear' condition of the hub.

FIGS. 2a 2b are sections taken on lines A—A and B—B respectively of the hub shown in FIG. 1;

FIG. 4 is a section taken on line C—C of FIG. 3;

Figure 1:
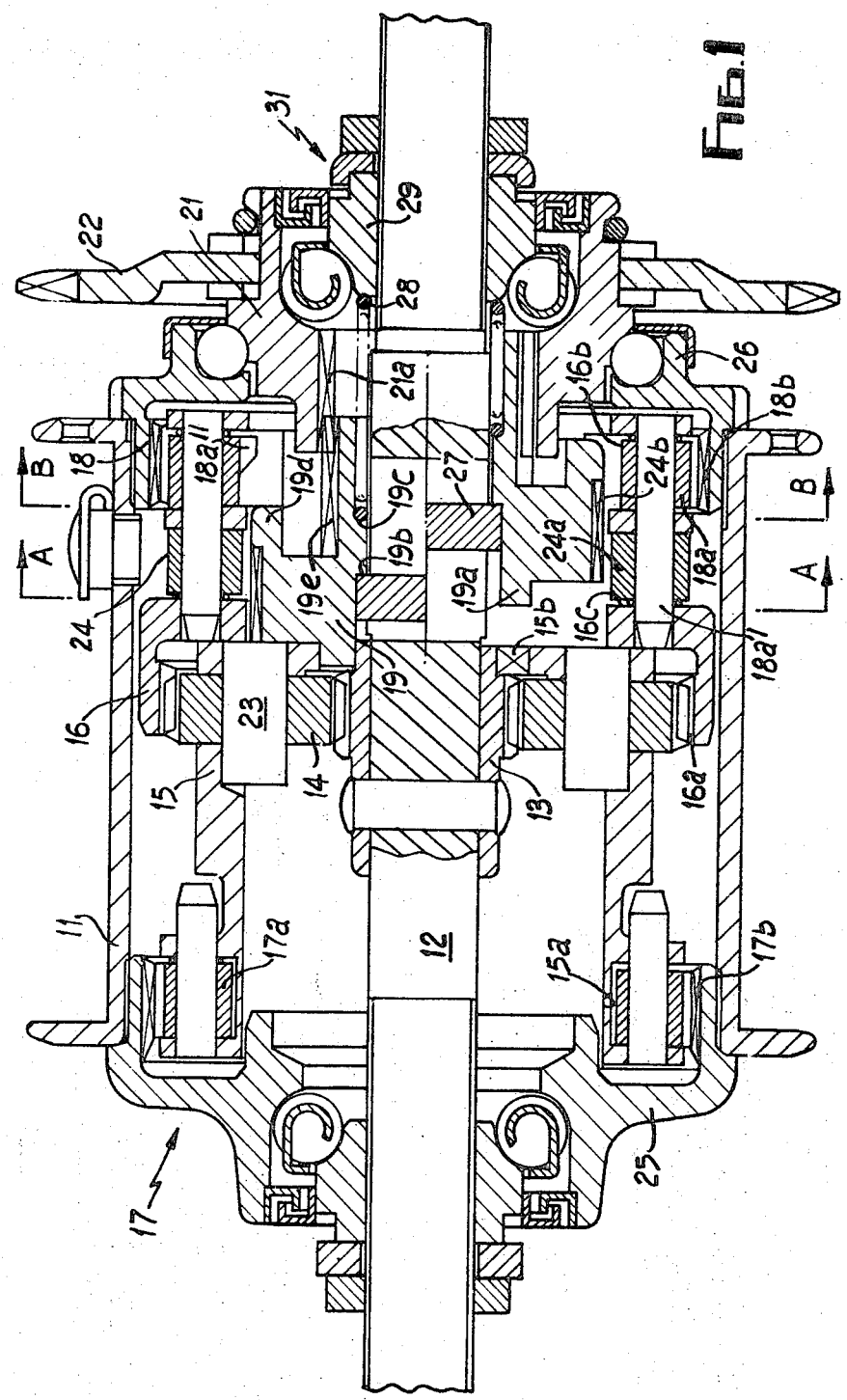
Figure 2A:
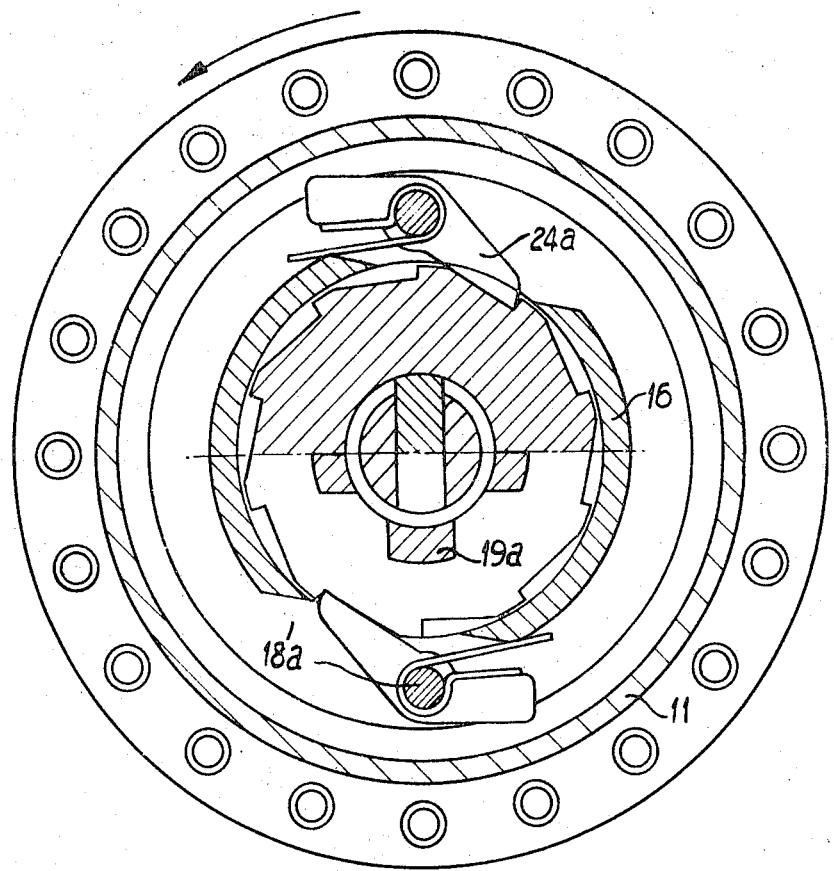
FIG. 2c is a fragmentary enlarged detail view of the cooperating dogs of the coupling sleeve and planet cage in the epicyclic change speed hub of FIG. 1.

Referring now to the drawings, and in particular to FIGS. 1 and 2 thereof, an epicyclic change-speed hub for a bicycle comprises a hub shell 11, a hub spindle 12 extending axially of the said hub shell, a fixed sun gear 13 secured to the hub spindle, a plurality, say four, of planet gears 14 angularly spaced about the sun gear 13 and in mesh therewith, the said planet gear being rotatably supported in a planet cage 15, a gear ring 16 arranged outwardly of the planet gears 14 and in mesh with such planet gears, a first uni-directional clutch means 17 between the planet cage 15 and hub shell 11, a second uni-directional clutch means 18 between the gear ring 16 and hub shell 11, a coupling sleeve 19 slidable on the hub spindle and selectively connectable with the planet cage or with the gear ring, and a driver 21 connected with the coupling sleeve and transmitting a drive motion to such sleeve from an input sprocket 22.

The planet cage 15 is of generally tubular form, one end of the said cage being thickened and pockets being provided therein to receive the planet gears, such gears being secured in position by planet pins 23, and the other end of the said cage having a radially outwardly directed enlargement formed with recesses 15a within which are pivotally supported spring loaded pawls 17a of the first uni-directional clutch means 17. That end of the planet cage which supports the planet gears is provided with internal dogs 15b for co-operation with complementary dogs 19a extending axially from the inner end of the coupling sleeve 19.

The gear ring 16 has an internal ring gear 16a in mesh with the planet gears 14, the gear ring 16 being of generally tubular form and being approximately co-extensive, in the axial direction of the hub, with the coupling sleeve 19, the said sleeve lying radially within the gear ring. Pockets 16b are provided in the gear ring to receive spring loaded pawls 18a of the second uni-directional clutch means 18, such pawls being pivotally mounted in the pockets by respective pawl pins 18a'.

A second series of pockets 16c is formed in the gear ring to receive pawls 24a of a further uni-directional clutch means 24, such pawls 24a co-operating with ratchet teeth 24b formed at the outer periphery of the coupling sleeve to provide a drive connection between such sleeve, and the gear ring, as will hereafter be made apparent.

The first uni-directional clutch means 17 comprises the pawls 17a carried by the planet cage and a ratchet ring 17b formed integrally with an end cap 25 secured to the hub shell as an end closure thereto, the said pawls co-operating with the ratchet ring to transmit a forward drive to the hub shell in the low gear condition of the hub, but over-running such ring in normal and high gear conditions of the hub.

The second uni-directional clutch means 18 comprises the pawls 18a carried by the gear ring 16 and a ratchet ring 18b formed integrally with a second end cap 26 likewise secured to the hub shell, the pawls 18a co-operating with the related ratchet ring 18b to transmit a drive motion to the hub in normal and high gears, such pawls 18a being tripped in the low gear condition of the hub as will hereafter be made apparent.

The coupling sleeve 19, in addition to presenting the axially extending dogs 19a for drive engagement with the co-operating internal dogs on the planet cage and the ratchet teeth 24b of the further uni-directional clutch means, is also provided with four radially outwardly directed arms 19e angularly spaced thereabout, the said arms being slidably engaged with corresponding internal formations 21a formed in the driver 21, and with a shoulder 19b against which is seated a clutch nut 27, the said nut 27 being coupled to an adjustment rod, not shown, and being spring-loaded towards the planet cage by a compression spring 28 arranged coaxially about the spindle and disposed between a reaction nut 29 screw threadedly engaged with the spindle, which nut forms the inner race of a driver bearing 31, and a further shoulder 19c in the bore of the coupling sleeve 19. The operation of the hub is as follows:

With the relative disposition of parts shown in the upper half of FIG. 1, which relative disposition of parts corresponds to a high gear condition of the hub, a drive is transmitted from the sprocket 22 via the driver 21 to the coupling sleeve 19 and thence through the co-operating dogs 19a, 15b to the planet cage. From the cage the drive is transmitted to the gear ring 16 through the planet gears 14 and from such gear ring to the second uni-directional clutch means 18 and thence to the hub shell. In the high gear condition of the hub, pawls 24a are held out of engagement with their co-operating ratchet ring on the coupling sleeve by the end region 19d of such sleeve, although drive engagement will in any event be avoided by the over-running of the gear ring 16 relative to the coupling sleeve 19.

An adjustment of the coupling sleeve 19 to the right (in FIG. 1) against the restraint of the spring 28, to a position intermediate those shown in the upper and lower parts of FIG. 1, will give normal gear, such an adjustment disengaging the co-operating dogs 19a, 15b in the coupling sleeve and planet cage respectively and shifting the coupling sleeve 19 to a position wherein the pawls 24a are in alignment with the co-operating ratchet ring 24b, for engagement therewith. The drive transmission, in normal gear, is from the driver 21 through the coupling sleeve 19 and the further uni-directional clutch means 24 to the gear ring 16, and thence to the hub shell 11 through the second uni-directional clutch means 18.

A still further axial adjustment of the coupling sleeve 19 to the right (as seen in FIG. 1) will bring the end region 19d of the coupling sleeve into abutment with a tail 18a'' formed on each of the pawls 18a to disengage such pawls from the co-operating ratchet ring. The drive transmission in low gear, to which gear the relative disposition of parts shown in the lower part of FIG. 1 corresponds, is from the driver 21 to the coupling sleeve 19 and thence to the gear ring 16 via the further uni-directional clutch means 24. Motion of the gear ring is transmitted to the planet cage 15 through the planet gears 14 and a final drive is transmitted to the hub shell through the first uni-directional clutch means 17.

In order to ensure that back-pedalling or wheeling a bicycle to which the hub is fitted backwards will have no damaging effect upon the hub, it is necessary to provide a means for disengagement of the dogs 19a of the coupling sleeve from the co-operating internal dogs 15b of the planet cage when high gear is selected. This is achieved, as shown in FIG. 2c, by backing off the co-operating dogs 19a, 15b such that a reverse motion of the coupling sleeve 19 relative to the planet cage 15 will automatically shift the sleeve 19 axially and out of engagement with the cage 15, such an arrangement being disclosed in U.S. Pat. No. 3,257,868.

Figure 3:
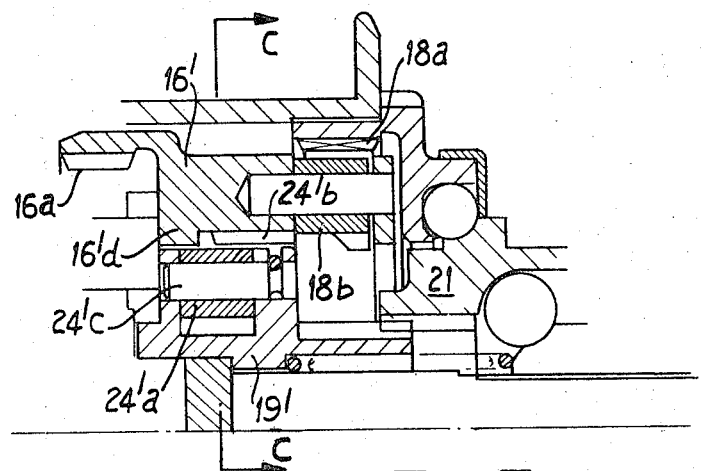
FIG. 3 is a part section of a modified form of hub.

In an alternative embodiment, the relative positions of the pawls and the ratchet ring of the further uni-directional clutch means are interchanged, such an arrangement being shown in FIGS. 3 and 4, the pawls 24'a being carried by the coupling sleeve 19 and being mounted thereon by pawl pins 24'c, the co-operating ratchet ring 24'b being formed internally on the gear ring 16' and such ring having an abutment 16'd for tripping the pawls 24'a in high gear.

In a still further arrangement, instead of providing tails to the pawls of the second uni-directional clutch means for use in tripping the pawls in the low gear condition of the hub, we propose to embody an axially shiftable gear ring whereby the pawls are tripped by engagement with suitable cam surfaces adjacent the ratchet ring. Having regard to the need to provide space within the hub to permit of the axial shift of the gear ring for tripping the pawls, we propose to arrange that the pawls of the second uni-directional clutch means and of the further such means lie in a common transverse plane of the hub, the pawls of the two uni-directional clutch means alternating at 90° intervals in the peripheral direction of the hub.

Figure 5:
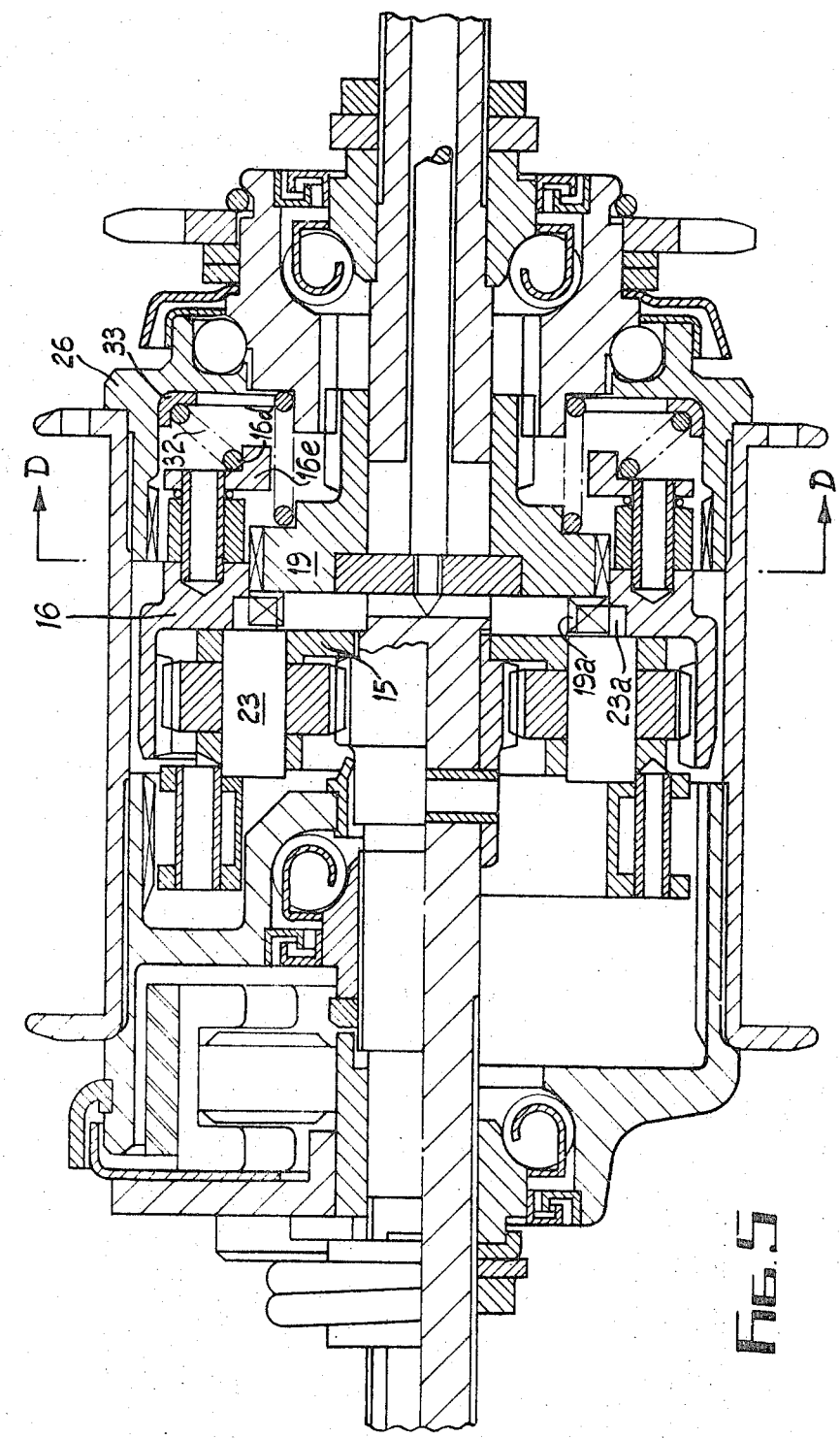
FIG. 5 is an axial section of a still further hub constructed in accordance with the invention.
Figure 6:
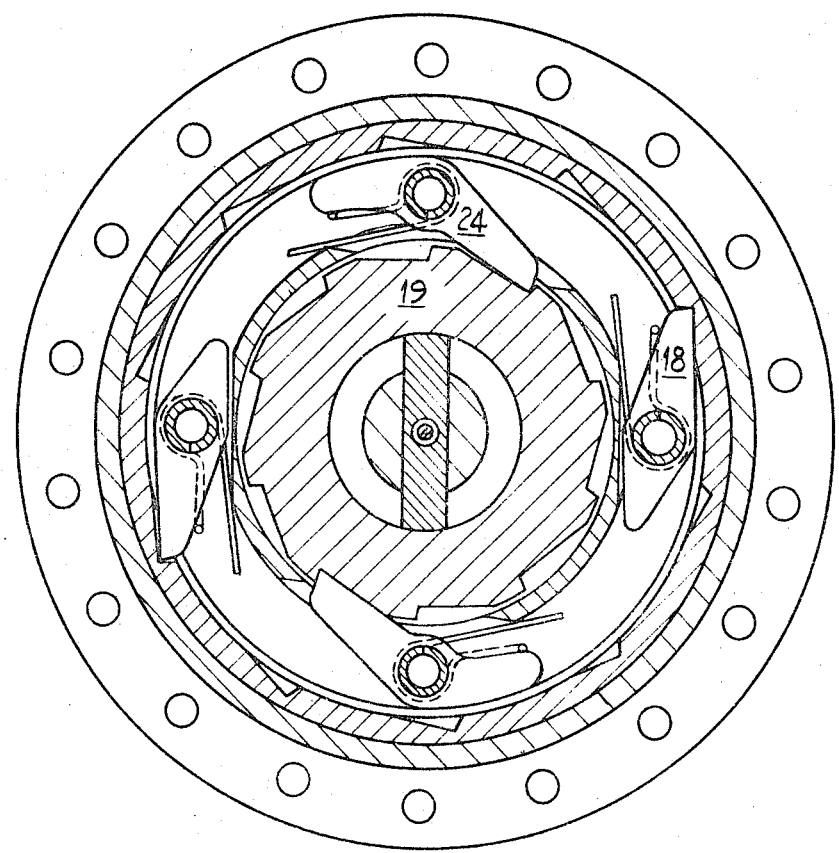
FIG. 6 is a section on line D—D of FIG. 5.

The aforesaid still further arrangement is illustrated in FIGS. 5 and 6 of the accompanying drawings. Thus, referring again to the drawings, and in particular to FIGS. 5 and 6 thereof, the gear ring 16 is axially shiftable against the restraint of a compression spring 32 extending between and seating on the end cap 26 and a stop 16d formed at the outer end of the gear ring, displacement of the gear ring outwardly of the hub resulting from abutment of the coupling sleeve 19 with a radially inwardly directed extension 16e to the ring at the outer end thereof. In order to reduce torsional effects on the compression spring 32, an acetal low friction disc 33 is interposed between the end of the spring and the end cap.

The hub shown in FIGS. 5 and 6 differs from the embodiments illustrated in FIGS. 1 to 4 not only as regards the use of an axially shiftable gear ring but also as regards the form and disposition of the drive connection between the inner end of the coupling sleeve and the planet cage in high gear. Thus, in the case of the hub of FIGS. 5 and 6, axially directed dogs 19a on the coupling sleeve 19 engage extensions 23a to the planet pins 23 and transmit a drive motion to the planet cage 15 through such pins.

It will be apparent that in adjusting between the various gear positions a positive drive transmission will be attained at all times and thus the inconvenience met with in a badly adjusted gear or when moving between gear positions in a conventional hub of a 'between-gear' position in which the coupling sleeve is wholly disengaged at the output side thereof is avoided.

Furthermore, the accuracy of adjustment necessary in the hub as herein-described and illustrated is less than that required with known hubs.

The invention is not limited to the exact features of the embodiments herein-described since alternatives will readily present themselves to one skilled in the art.

Thus, whilst we prefer to utilise pawl and ratchet arrangements as uni-directional clutch means, other known constructions, such as those incorporating balls captively located in inclined recesses in one element and co-operating with an adjacent element may be utilised.

The drive connection between the coupling sleeve and the planet cage may differ from those described and illustrated in that external dogs may be provided on the planet cage for co-operation with internal complementary dogs on the coupling sleeve.

What we claim is:

1. An epicyclic change-speed hub comprises a hub shell, a hub spindle extending axially of the said hub shell, a fixed sun gear secured to the said spindle, a plurality of planet gears angularly spaced about the said sun gear and in mesh therewith, a planet cage rotatably supporting the said planet gears, a gear ring arranged coaxially with the sun gear and in mesh with the said planet gears, a first uni-directional clutch means between the planet cage and hub shell, a second uni-directional clutch means between the gear ring and hub shell, a driver rotatably mounted relative to the hub spindle and arranged coaxially therewith, an axially slidable coupling sleeve drivingly connected with the said driver and selectively connectable with the planet cage and the gear ring according to gear selection, and a further uni-directional clutch means arranged between the coupling sleeve and gear ring, the said further unidirectional clutch means transmitting a drive motion from the coupling sleeve to the gear ring in the drive direction thereof and according to gear selection not transmitting a drive motion from the coupling sleeve to the gear ring in the drive direction thereof and the coupling sleeve being automatically disengageable from the planet cage on reverse motion of the driver and the sleeve relative to the sun gear, if so engaged.

2. An epicyclic change speed hub as claimed in claim 1 wherein the further uni-direction clutch means comprises a pawl and ratchet arrangement.

3. An epicyclic change speed hub as claimed in claim 2 wherein pawls of the pawl and ratchet arrangement which defines the further uni-direction clutch means are carried by the gear ring and the ratchet with which such pawls co-operate is provided on the coupling sleeve.

4. An epicyclic change speed hub as claimed in claim 2 further including a trip means holding the pawls of such arrangement in an inoperative position and releasing such pawls into an operative position according to the relative axial positions of the gear ring and coupling sleeve.

5. An epicyclic change speed hub as claimed in claim 1 wherein the second uni-directional clutch means and the further such means are provided in a common transverse plane of the hub.

6. An epicyclic change speed hub as claimed in claim 5 wherein the second uni-directional clutch means and the further such means are arranged alternately in the peripheral direction of the coupling sleeve.

7. An epicyclic change speed hub as claimed in claim 1 wherein the gear ring is shiftable axially of the hub, and against the restraint of a return spring, to render the second uni-directional clutch means inoperative in transmitting a drive to the hub shell in low gear.

8. An epicyclic change speed hub as claimed in claim 7 wherein one end of the return spring is seated against a low-friction disc.

* * * * *